United States Patent
Brooks

(10) Patent No.: US 8,843,722 B2
(45) Date of Patent: Sep. 23, 2014

(54) RESET DAMPENER

(75) Inventor: Robert C. Brooks, Houston, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 958 days.

(21) Appl. No.: 12/692,980

(22) Filed: Jan. 25, 2010

(65) Prior Publication Data

US 2011/0185143 A1 Jul. 28, 2011

(51) Int. Cl.
- G06F 12/00 (2006.01)
- G06F 1/24 (2006.01)
- G06F 13/40 (2006.01)

(52) U.S. Cl.
CPC .............. G06F 1/24 (2013.01); G06F 13/4086 (2013.01)
USPC .................................. 711/166; 711/E12.002

(58) Field of Classification Search
USPC ........................................................ 711/166
See application file for complete search history.

(56) References Cited

U.S. PATENT DOCUMENTS

| | | | |
|---|---|---|---|
| 5,233,557 A * | 8/1993 | Sakagami et al. | 365/189.04 |
| 7,372,293 B2 | 5/2008 | Cox et al. | |
| 7,539,826 B2 | 5/2009 | Chae et al. | |
| 7,616,039 B2 | 11/2009 | Huang et al. | |
| 7,619,937 B2 * | 11/2009 | Yun et al. | 365/201 |
| 2003/0141909 A1 * | 7/2003 | Iwaguro et al. | 327/142 |
| 2005/0116754 A1 * | 6/2005 | Ichikawa | 327/198 |
| 2007/0170971 A1 * | 7/2007 | Lai et al. | 327/310 |
| 2008/0030245 A1 * | 2/2008 | Elrod et al. | 327/143 |
| 2008/0256281 A1 | 10/2008 | Fahr et al. | |
| 2009/0273960 A1 | 11/2009 | Kim et al. | |
| 2010/0026357 A1 * | 2/2010 | Chan et al. | 327/198 |
| 2010/0078488 A1 * | 4/2010 | Nagatsuka | 235/492 |
| 2010/0085296 A1 * | 4/2010 | Choi et al. | 345/102 |

OTHER PUBLICATIONS

PC3-12800 DDR3 Unbuffered MicroDIMM Reference Design Specification, JEDEC Standard No. 21C, Revision 0.34, Feb. 2007, http://www.jedec.org/download/search/4_20_17R17.pdf.

* cited by examiner

Primary Examiner — Reginald Bragdon
Assistant Examiner — Aracelis Ruiz
(74) Attorney, Agent, or Firm — Reed Hablinski

(57) ABSTRACT

A memory reset system including a first memory socket and a second memory socket. A reset signal generator can generate a reset signal to the first memory socket. A dampener circuit can receive the reset signal from the reset signal generator and transmit a dampened reset signal to the second memory socket.

20 Claims, 7 Drawing Sheets

RESET DAMPENER

BACKGROUND

A computing device can include multiple memory modules. The memory modules in a computing device can include removable memory modules. The removable memory modules can be connected to the computing device with a socket. A computing device may not have a memory module in every socket. The memory modules in the sockets can include multiple memory integrated circuits (ICs). The memory ICs on the memory module can be reset so that they may be forced into a known state. The resetting of the memory module is done by a signal received by the memory module at its reset input. Once reset, the memory modules must be initialized to prepare them for normal operation. The memory modules can be in the form of dual in-line memory modules (DIMMs).

BRIEF DESCRIPTION OF THE DRAWINGS

Some embodiments of the invention are described with respect to the following figures.

DETAILED DESCRIPTION

Figure 1:
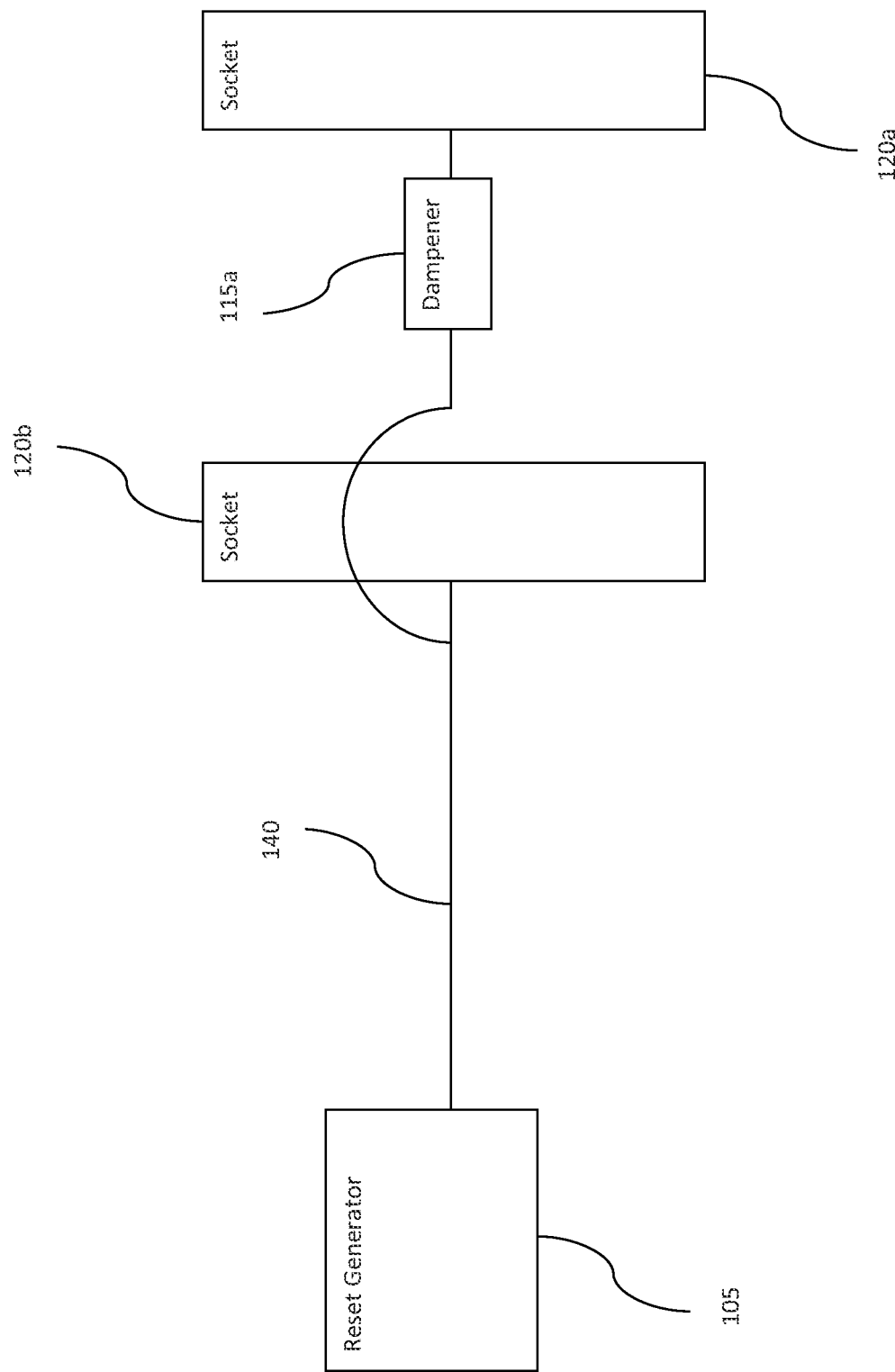
FIG. 1 is a block diagram of a memory reset system according to an example embodiment of the invention.

If power is applied to the memory module, the memory module can be in an unknown state. Before the normal operation of writing data to and reading data from a memory module, the memory module enters the RESET state. In one embodiment the memory module has a reset input to put the memory module into the RESET state.

A reset signal, RESET#, can be generated by a computing device to put the memory module in the RESET state. In one embodiment, holding the reset input low during power-up of the memory module ensures that output pins of the memory module remain disabled and it also resets all internal state machines so that there are no erroneous start-up states. The reset input can be an asynchronous input that triggers any time it drops low and there may not be restrictions on when it can go low. After the reset input goes low, all output pins are disabled in one embodiment, and all other relevant circuitry within the Dynamic Random Access Memory (DRAM) are reset. It can be assumed that the data stored in the DRAM and the mode register values are unknown after reset input is brought low. In an alternative embodiment the RESET state is entered if the reset input is brought high.

The reset signal can be received by multiple memory modules to reset the memory modules to the RESET state. Normal read and/or write activity to a memory module may cause noise to be inductively coupled onto the reset signal. The noise can be measured at the reset input on the memory module. The noise may have a small amplitude relative to the low and high levels of the reset signal at the reset input of a single memory module. If multiple memory modules are connected to the same reset signal path, the amplitude of the noise created by multiple memory modules may increase due to constructive interference. If the amplitude of the noise reaches a threshold voltage, the memory module may inadvertently go to the RESET state where it is assumed that the data stored in the DRAM is unknown. From the RESET state the memory module can be initialized. Initialization may include setting the mode registers to determine operations such as burst length and write leveling. In one embodiment the memory module may be calibrated after initialization and the calibration can be of the output driver for example.

A computing device may include a socket to receive a memory module. The socket can allow different memory modules to be connected to the computing device. The different memory modules can have different circuit features. For example, one memory module may include a filter on the reset input and another memory module may not include a filter on the reset input. Memory modules with a filter on the reset input may filter out the noise generated by a memory module on the reset signal path. Some memory modules do not include a filter on the reset input and noise on the reset signal path may cause the memory module to reset to a RESET state; in the RESET state it is assumed that the data stored on the DRAM is unknown. It may be unknown which models of different memory modules may include a filter or generate noise on the reset input path. A dampener can reduce the noise on the reset signal path so that the memory module is not inadvertently put into the RESET state by the noise. The dampener can be closer to the socket and the memory module than to other components, for example the dampener can be between the reset signal generator and the socket for the memory module.

On double data rate 3 (DDR3) DIMMs, energy from high frequency signal transitions is coupled onto the reset signal. It is possible for the energy to propagate off of the originating DIMM and to be transmitted to other DIMMs. It is also possible for this energy to interfere with other DIMMs from which the reset signal may have also had energy coupled onto it. The constructive interference between the DIMMs can resonate and the resulting voltage oscillation, noise, can build to an amplitude that can cause one or more DIMM devices to be reset. The noise or resonance on the reset signal path can be generated on a DIMM itself when high speed signals transition. In Dual channel mode, two DIMMs can have signals transitioning simultaneously. If the reset signal is routed to the DIMMs such that both DIMMs are tied directly to the same reset signal, the noise generated on a first DIMM can propagate to a second DIMM. It is possible for the signals switching on each DIMM to align at the right time in order for the noise generated on each DIMM to oscillate between the DIMMs on the reset path and reset the DIMMs.

In one embodiment, a memory reset system includes a reset signal generator. The reset signal generator is connected to a dampener circuit that receives a reset signal. The system can include memory module sockets wherein the dampener circuit is between two of the memory module sockets.

In one embodiment, a memory reset system includes first memory sockets on a first channel and second memory sockets on a second channel. A reset signal generator can generate a reset signal to the first memory sockets and a dampener circuit can receive the reset signal and transmit a dampened reset signal to the memory sockets on the second channel.

With reference to the figures, FIG. 1 is a block diagram of a memory reset system according to an example embodiment of the invention. A computing device may include a memory reset system. A computing device can include multiple memory module sockets 120*a* and 120*b*. The memory module sockets 120*a* and 120*b* can be used to connect memory modules to the computing device. The memory modules can be used to store data. In one embodiment, the memory modules may need to be reset to a RESET state, initialized and calibrated before data can be stored on the memory modules.

A reset signal can be generated by a reset generator 105. The reset generator 105 may be part of the memory controller integrated into the north bridge integrated circuit (IC) or the micro-processor of the computing device. The reset signal from the memory controller can be transmitted on the reset signal path 140 to the reset signal pin in the socket 120*a* and 120*b*. If a first memory module is connected to the socket 120*b*, the memory module may generate noise that is carried on the reset signal path 140 to a second memory module connected to the socket 120*a* if there is not a dampener 115*a*. Similarly, without a dampener, the second memory module connected to 120*a* may generate noise that is carried on the reset signal path 140 to a first memory module connected to the socket 120*b*.

The dampener can be connected to the reset signal path 140 to receive the reset signal from reset generator 105. If the noise on the reset signal path oscillates between at least two memory modules generating noise on the reset signal path 140 then the number of dampeners used may be 1 less than the number of sockets. If the dampener can prevent the noise oscillation from all but one of the memory modules then the amplitude of the noise on the reset signal path may not reach the threshold level that causes the memory modules to be inadvertently reset. The threshold level can be for example 0.2 volts if the reset state is entered when the reset input is low. The dampener 115*a* receives the reset signal from the reset generator 140 and transmits the signal to the socket 120*a* but the dampener does not allow any noise signal generated at the socket 120*a* by the memory module to travel along the reset signal path to the memory module in socket 120*b* or the reset generator 105.

In one embodiment the noise generated by the memory module on the reset signal input path can cause problems with other memory modules and other components. If the dampener is closer to the socket that can receive the memory module than to other components then the noise does not travel as far to reduce the possibility that the noise can cause problems. To allow the dampener to be closer to the reset input of socket 120*a* than to other components, such as reset generator 105 or socket 120*b*, the dampener can be mounted between the sockets 120*a* and 120*b*, in one embodiment.

Figure 2:
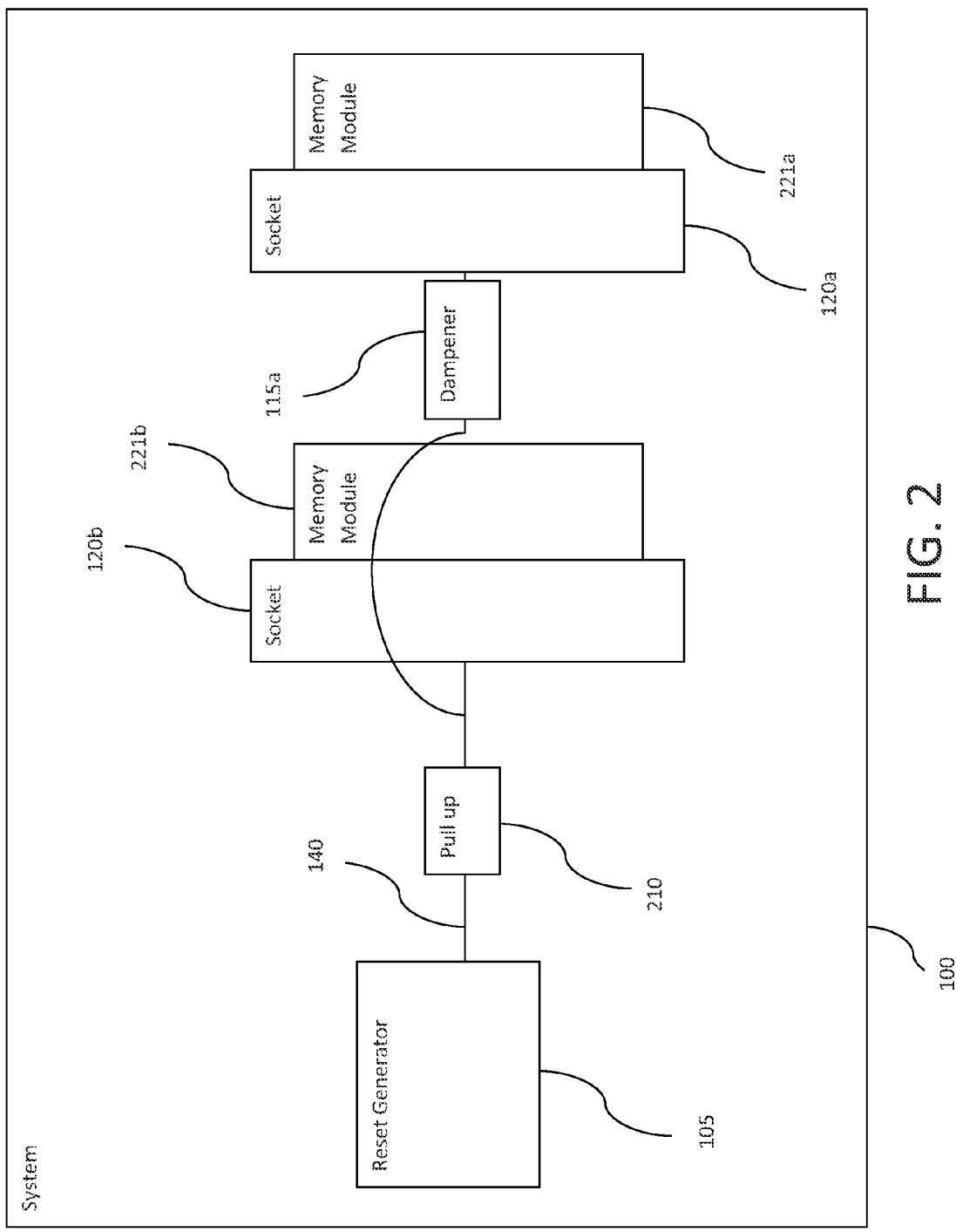
FIG. 2 is a block diagram of a memory reset system according to an example embodiment of the invention.

FIG. 2 is a block diagram of a memory reset system according to an example embodiment of the invention. A computing device can include a system board 100 that includes the electrical paths that connect components together. In one embodiment the reset generator 105 may not be able to drive a reset signal to all of the memory modules 221*a* and 221*b* connected to the sockets 120*a* and 120*b*. To drive all of the memory modules 221*a* and 221*b* a pull-up circuit 210 can be included. The pull-up circuit can be connected to the reset generator 105 by the reset signal path 140. The pull-up circuit can receive the reset signal from the reset generator 105 and pull the voltage up to a level that is received by the memory module 221*a* and 221*b*.

The location of the pull-up circuit on the system board may be dependent on the location of the sockets 120*a* and 120*b* and the reset generator 105. For example a pull-up circuit may not be used if the reset generator 105 and the sockets 120*a* and 120*b* are located close on the system board 100. In another example a pull-up circuit may be between the dampener 115*a* and the memory modules 221*a* and 221*b*. In one embodiment the memory modules 221*a* and 221*b* can be connected to the reset signal path and the memory module 221*a* and 221*b* is not connected to a socket.

Figure 3:
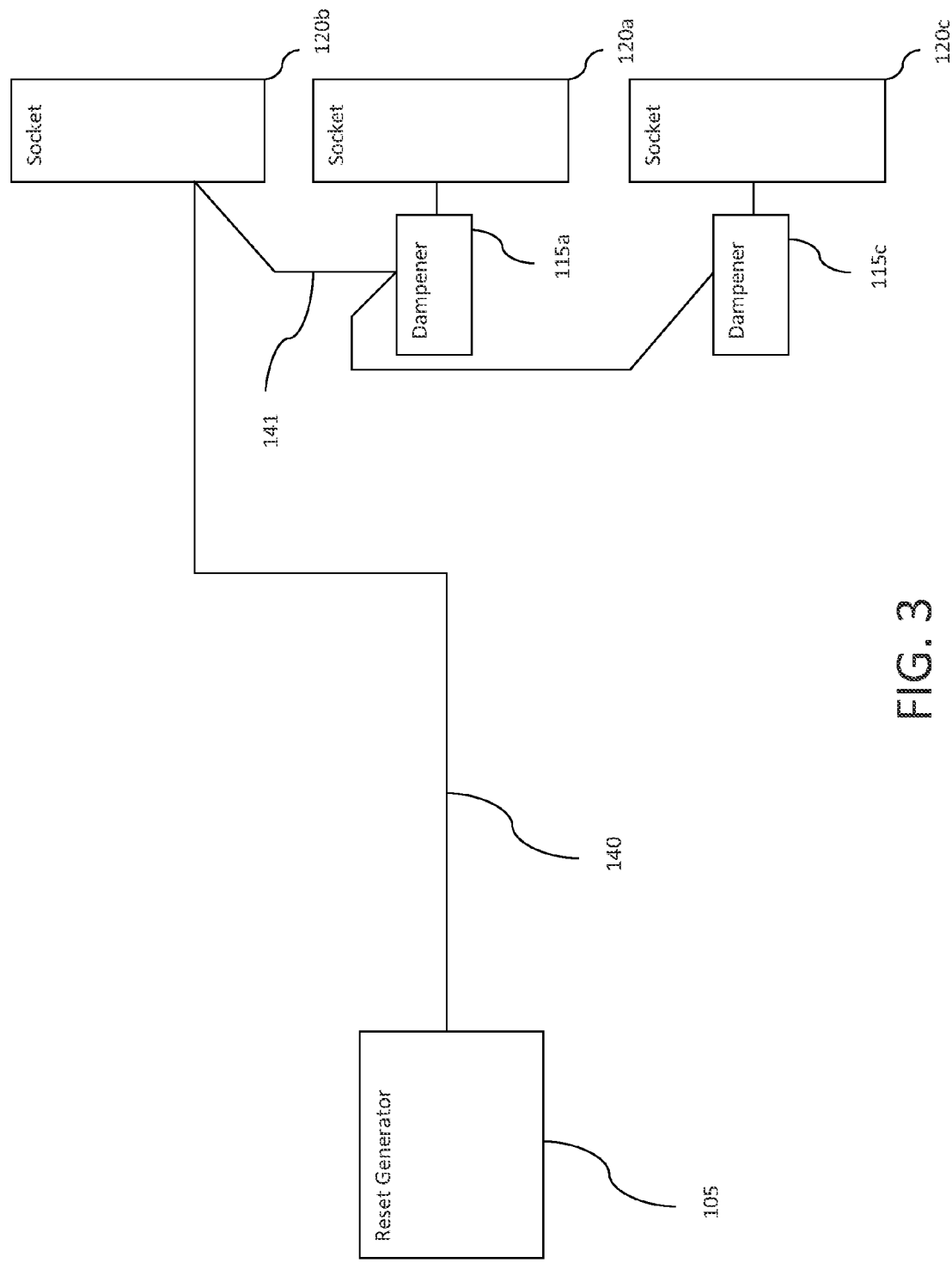
FIG. 3 is a block diagram of a memory reset system according to an example embodiment of the invention.

FIG. 3 is a block diagram of a memory reset system according to an example embodiment of the invention. A computing device can include multiple sockets 120*a*, 120*b*, and 120*c*. A reset generator 105 can generate a reset signal to the socket 120*b*. The reset signal can be transmitted on reset signal path 140 to the socket 120*b* and then to 120*c*. In one embodiment the reset signal is daisy chained from the first socket 120*b* to the second socket 120*a* through a dampener 115*a* and then to a third socket 120*c* through a dampener 115*c*. Daisy chaining can mean that the second reset signal path 141 is connected to the same connector on socket 120*b* as the reset signal path 140 is connected. Although the embodiment shows that the reset signal received by the dampener 115*a* is through a daisy chained path, it is not limited to the daisy chained path and may include a reset signal path that splits into multiple paths.

In one embodiment the dampener 115*a* is closer to the socket 120*a* than it is to the socket 120*b*. In one embodiment the dampener 115*a* is closer to the socket 120*a* than it is to the reset generator 105. In one embodiment the dampener 115*a* is closer to the socket 120*a* than to a pull-up circuit. Locating the dampener 115*a* closer to the socket 120*a* than to other components or circuits can reduce the noise since the reset signal path can be shortened between the dampener 115*a* and the socket to provide a shorter resonating path created by the reset signal path between the dampener 115*a* and the socket 120*a*.

Figure 4:
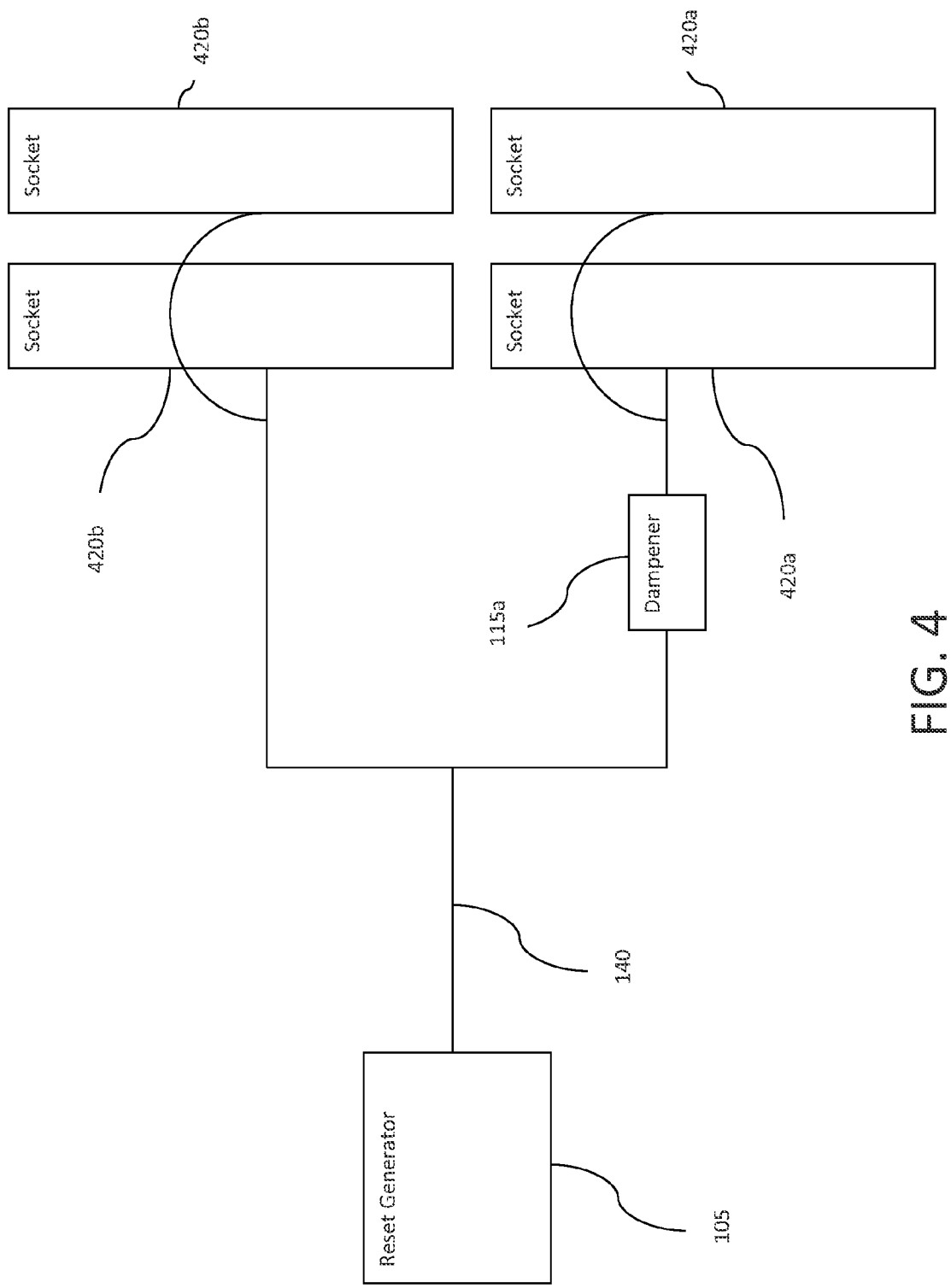
FIG. 4 is a block diagram of a memory reset system according to an example embodiment of the invention.

FIG. 4 is a block diagram of a memory reset system according to an example embodiment of the invention. In one embodiment the sockets for the memory modules are grouped into different channels. For example there may be two sockets on channel one and two sockets on channel two for a total of four sockets, but there may be more than two channels and more than two sockets per channel. If the memory sockets 420*a* and the memory sockets 420*b* are on different channels a dampener may not be used to isolate the reset path on each memory socket on each channel. For example the dampener 115*a* may be used to dampen the noise generated at sockets 420*a* and 420*b*, and to reduce the chance, compared to a circuit without the dampener 115*a*, that the noise on the reset signal path 140 will reset the memory connected to any of the sockets 420*b* in channel one or in sockets 420*a* in channel two.

Figure 5:
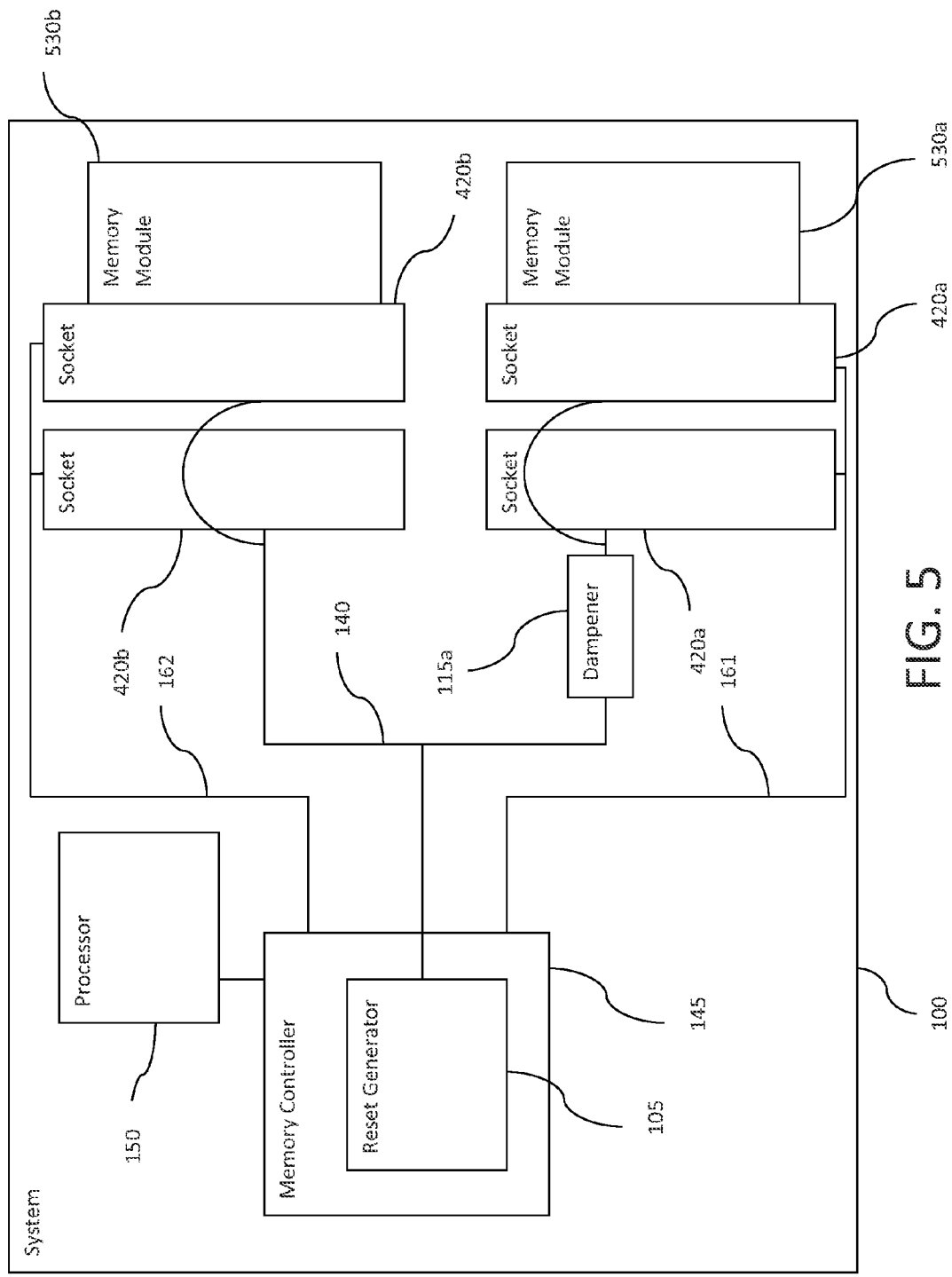
FIG. 5 is a block diagram of a memory reset system according to an example embodiment of the invention.

FIG. 5 is a block diagram of a memory reset system according to an example embodiment of the invention. A computing device may include multiple channels of memory. A memory channel can be a connection between a processor 150 and memory modules. For example the sockets 420*b* may share a connection to the processor 150 through a connection to the memory controller 145 and the sockets 420*a* may share a connection to the processor 150 through a connection to the memory controller 145. In one embodiment the memory modules on a channel may generate noise on to the reset signal path 140. For example the memory module 530*b* on the first channel may generate noise that is on the reset signal path 140. In one embodiment the noise generated by the modules on the same channel does not oscillate, and therefore, the amplitude of the noise may not cause the memory modules connected to the first channel to reset. The dampener 115*a* can dampen the noise generated by memory modules 530*a* connected to the sockets 420*a* on a different channel than the sockets 420*b*. The dampener can reduce the noise on the reset signal path by creating a signal path for the reset signal to travel through the dampener 115*a* in one direction from the reset generator 105 to the memory module 530*a* and not allow noise to travel in the direction from the memory module 530*a* to the reset generator or the memory module 530b. A dampener may not be used if the high frequency signals that generate the noise on the reset signal path are the same high frequency signals that are transmitted to the other memory modules on the same memory channel.

Figure 6:
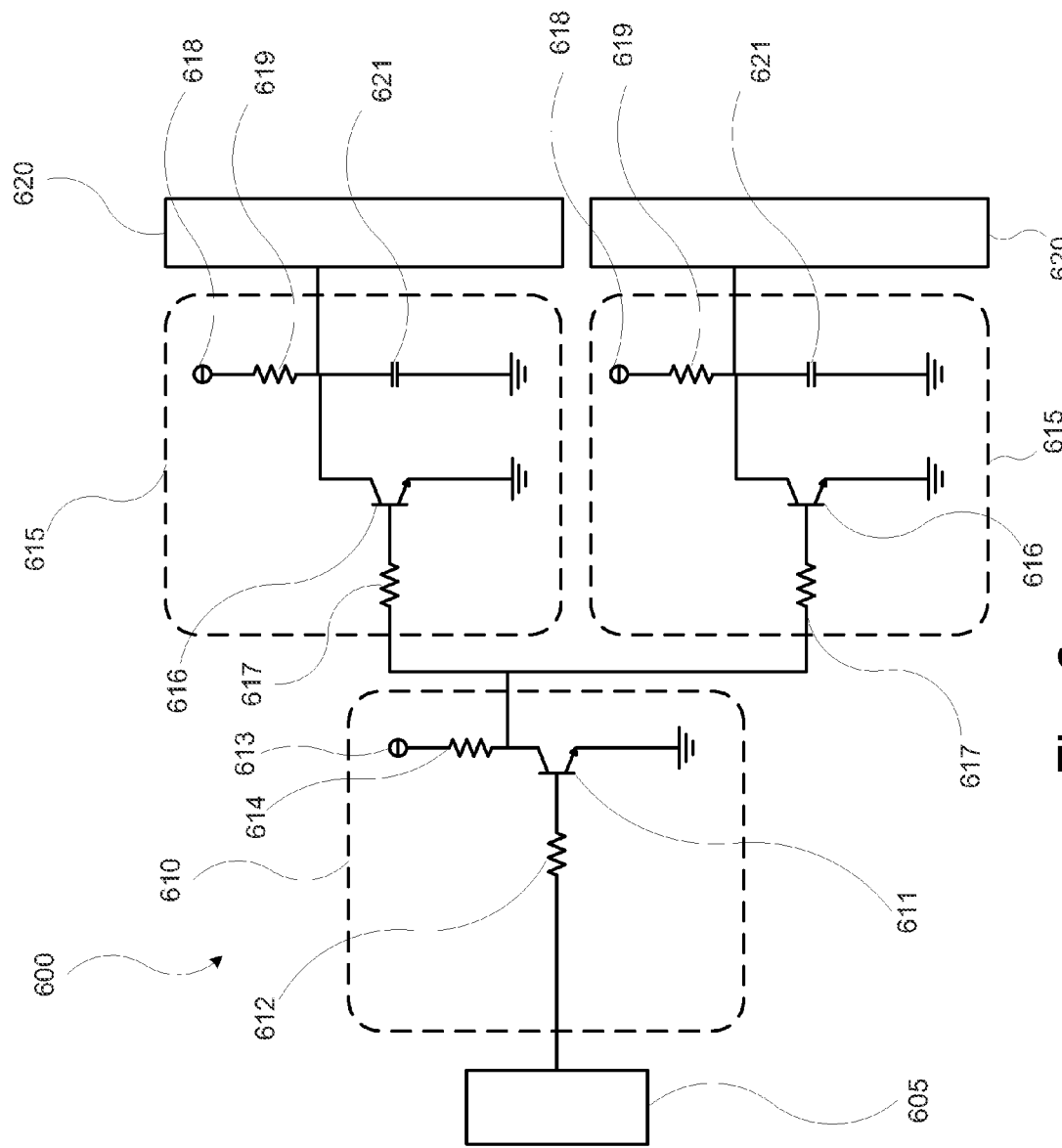
FIG. 6 is circuit schematic of a memory reset system according to an example embodiment of the invention.

FIG. 6 is a circuit schematic of a memory reset system according to an example embodiment of the invention. A system 600 can include a pull-up circuit 610 connected to a reset generator 605. The pull-up circuit 610 can include a transistor 611 connected to ground and connected to the reset generator 605 through a resistor 612. The transistor 611 can be connected to a voltage source 613 through a resistor 614. The output of the pull-up circuit 610 can be between the resistor 614 and the transistor 611. The output of the pull-up circuit may be the inverse of the reset signal generated by the reset generator 605.

A damper circuit 615 can include a transistor 616 connected to ground and connected to the output of the pull-up circuit 610 through a resistor 617. The transistor 616 can be connected to a voltage source 618 through a resistor 619. The voltage source 618 can be the same voltage source or may be a different voltage source than the voltage source 613 of the pull-up circuit 610. The output of the dampener 615 can be between the resistor 619 and the transistor 616. The dampener 615 may include a capacitor 621 between the output of the dampener 615 and ground. The output of the dampener 615 may be the inverse of the signal received by the dampener 615. In one embodiment, if there is a dampener 615 and a pull-up circuit 610 that both output an inverse signal then the socket 620 receives a non-inverted reset signal as it is generated by the reset generator 605.

The dampener 615 and the pull-up circuit 610 could have many different circuit designs. In one embodiment the dampener 615 may have a circuit design that outputs a non-inverted signal. The non-inverted signal may be used if a dampener is not the source of the reset signal connected to each of the sockets in a computing device. For example if a dampener generates an inverted signal but is not attached to each of the sockets, some of the sockets would be receiving the inverted signal from the dampener and some of the circuits may be receiving the non-inverted signal from the reset generator or the pull-up circuit.

Figure 7:
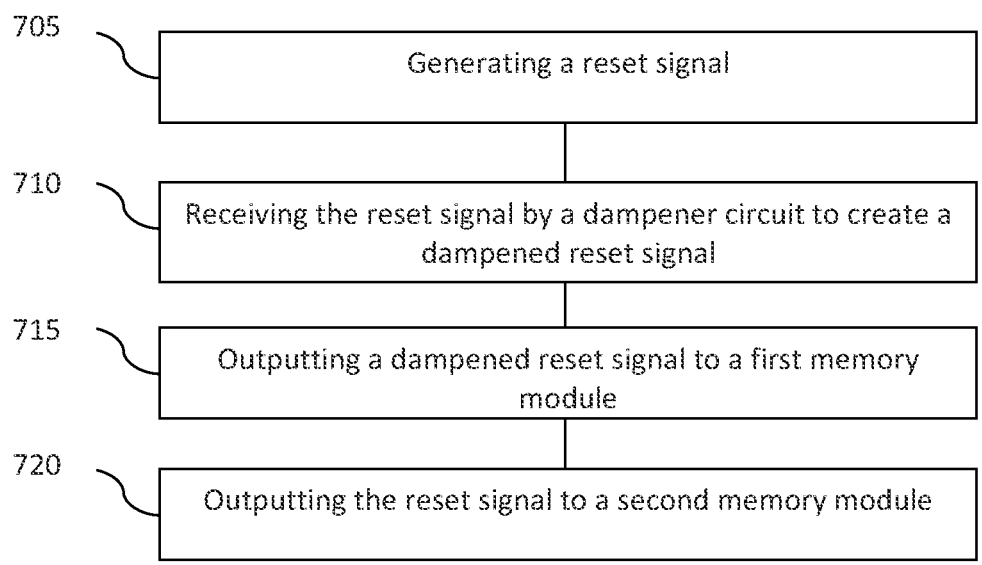
FIG. 7 is a flow chart according to an example method according to an embodiment of the invention.

FIG. 7 is a flow chart according to an example method according to an embodiment of the invention. The method of resetting memory can include generating a reset signal at 705. The reset signal can be generated in one embodiment by a reset generator in a component such as the north bridge IC or micro-processor of a computing device.

The reset signal can be received by a dampener circuit to create a dampened reset signal at 710. The dampened reset signal can reset the memory modules that are connected to the dampener circuit.

A dampened reset signal can be output to a first memory module at 715. The dampened reset signal may be similar to the reset signal or may be the inverse of the reset signal generated by the reset generator. The dampener circuit does not dampen the reset signal generated by the reset generator but can dampen the noise that is generated at the output of the dampener circuit generated by the memory module connected to the output of the dampener circuit.

The reset signal can be output to a second memory module at 720. The reset signal path may be connected between the second memory module and the reset generator or there may be some intervening circuitry. For example the reset generator may output the reset signal to a pull-up circuit.

In the foregoing description, numerous details are set forth to provide an understanding of the present invention. How-ever, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A memory reset system comprising:
   a reset signal generator;
   an asynchronous dampener circuit to receive a reset signal initiated by the reset signal generator; and
   memory module sockets wherein the dampener circuit is between two memory module sockets,
   wherein the dampener circuit dampens noise generated at a memory module socket.

2. The system of claim 1, further comprising a pull-up circuit between the reset signal generator and the dampener circuit.

3. The system of claim 1, further comprising a memory module connected to the socket.

4. The system of claim 1, wherein the dampener circuit is not connected to one of the memory sockets.

5. The system of claim 1, further comprising a memory module with a reset input connected to the dampener circuit.

6. The system of claim 1, further comprising a second memory module with a reset input connected to the reset signal generator.

7. The system of claim 1, further comprising a system board wherein a socket on a system board is closer to the dampener circuit than to a second socket.

8. The system of claim 1, further comprising a system board wherein a socket on the system board is closer to the dampener circuit than to a pull-up circuit.

9. The system of claim 1, further comprising a system board wherein a socket on the system board is closer to the dampener circuit than to a reset signal generator.

10. The system of claim 1, wherein the dampener circuit comprises:
    a first resistor connected between an input of the dampener circuit and a transistor, the transistor connected to ground;
    a second resistor connected between the transistor and a voltage source; and
    a capacitor connected between an output of the dampener circuit and ground, the output of the dampener circuit between the second resistor and the transistor.

11. A method of resetting memory comprising
    generating a reset signal;
    receiving the reset signal by an asynchronous dampener circuit to create a dampened reset signal;
    outputting a dampened reset signal to a first memory module;
    receiving the reset signal by a second memory module; and
    dampening noise generated by the first memory module on a reset signal path with the dampener circuit.

12. The method of claim 11 further comprising pulling up the reset signal received by the dampener circuit.

13. A memory reset system comprising:
    first memory sockets on a first channel;
    second memory sockets on a second channel;
    a reset signal generator to generate a reset signal to the first memory sockets; and
    an asynchronous dampener circuit to receive the reset signal and transmit a dampened reset signal to the second memory sockets on the second channel, wherein the dampener circuit dampens noise generated at the second memory sockets.

14. The system of claim 13 further comprising attaching the circuits to a socket including contacts for receiving the memory module.

15. The system of claim 13, wherein the dampener circuit isolates a reset signal path connected to the first memory sockets and a dampened reset signal path connected to the second memory sockets.

16. The system of claim 13, further comprising a memory module including a reset input to receive the reset signal if the memory module is connected to the first memory sockets on the first channel.

17. The system of claim 13, further comprising a second memory module including a reset input to receive the dampened reset signal if the second memory module is connected to the second memory sockets on the second channel.

18. The system of claim 13, wherein the dampener circuit is located between the first memory sockets on the first channel and the second memory sockets on the second channel.

19. The system of claim 13, further comprising a system board wherein the second memory sockets on a system board are closer to the dampener circuit than to the first memory sockets.

20. The system of claim 13, further comprising a system board wherein a second memory socket on the system board is closer to the dampener circuit than to a reset signal generator.

* * * * *